A. BARR AND W. STROUD.
INSTRUMENT FOR USE IN TESTING TORPEDOES.
APPLICATION FILED JULY 17, 1920.
1,404,422.
Patented Jan. 24, 1922.
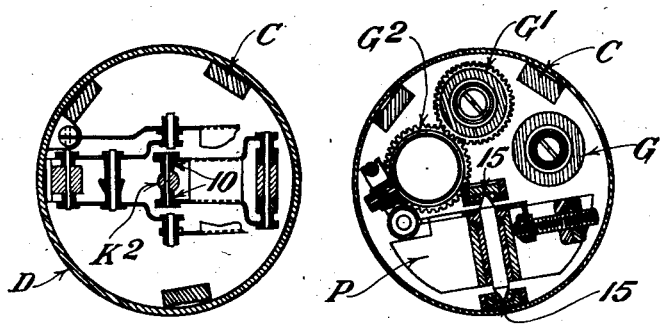
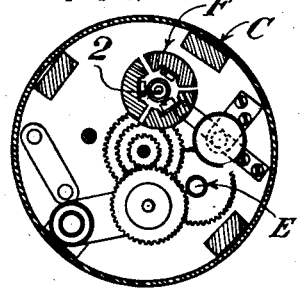
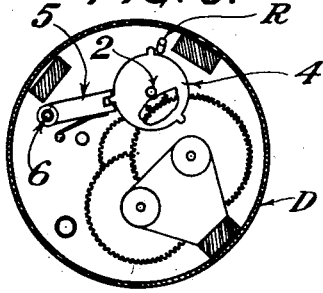
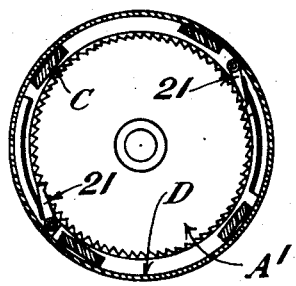
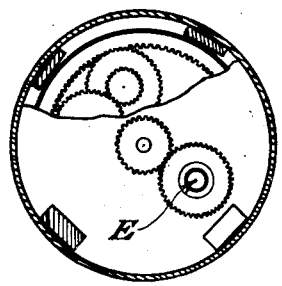

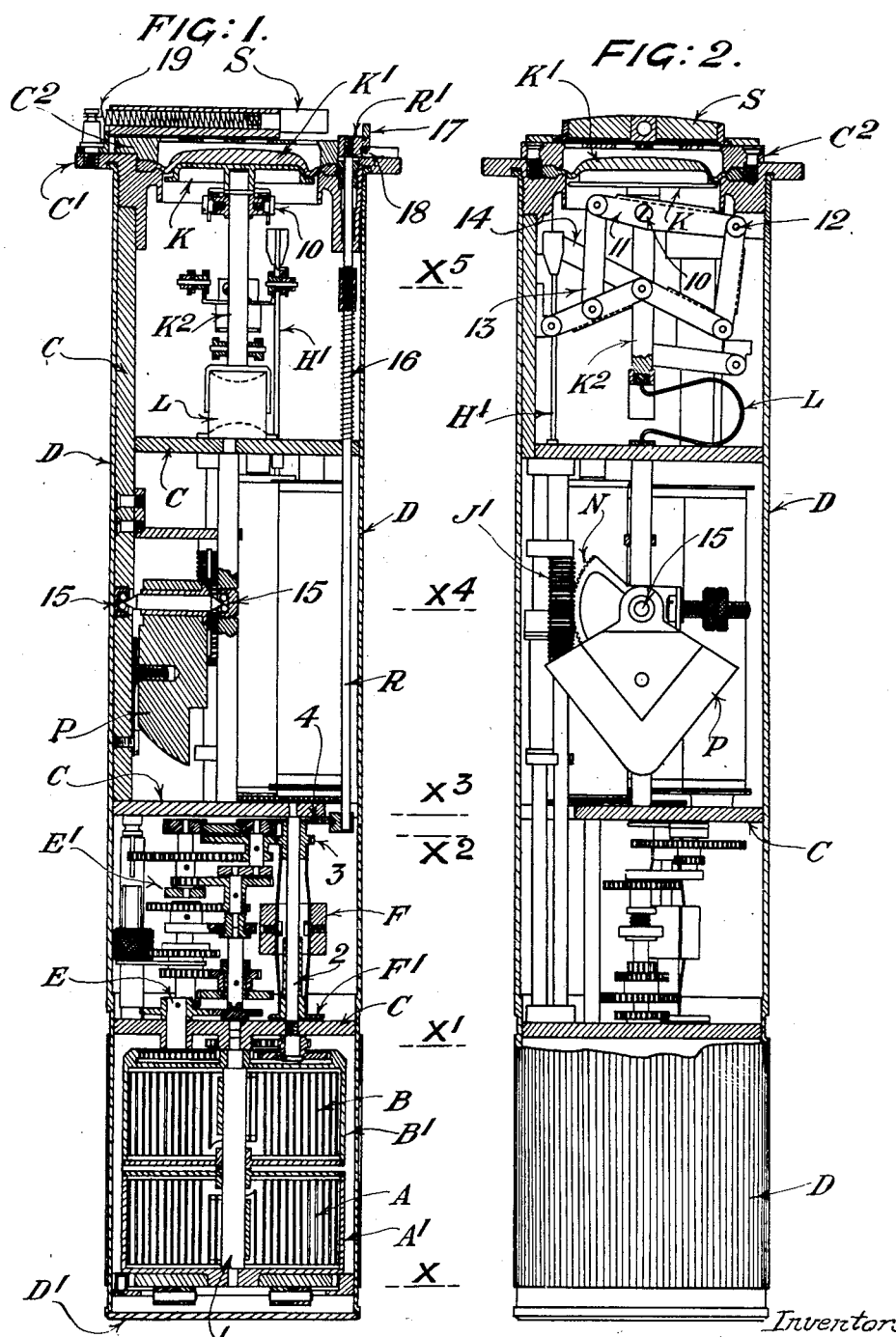

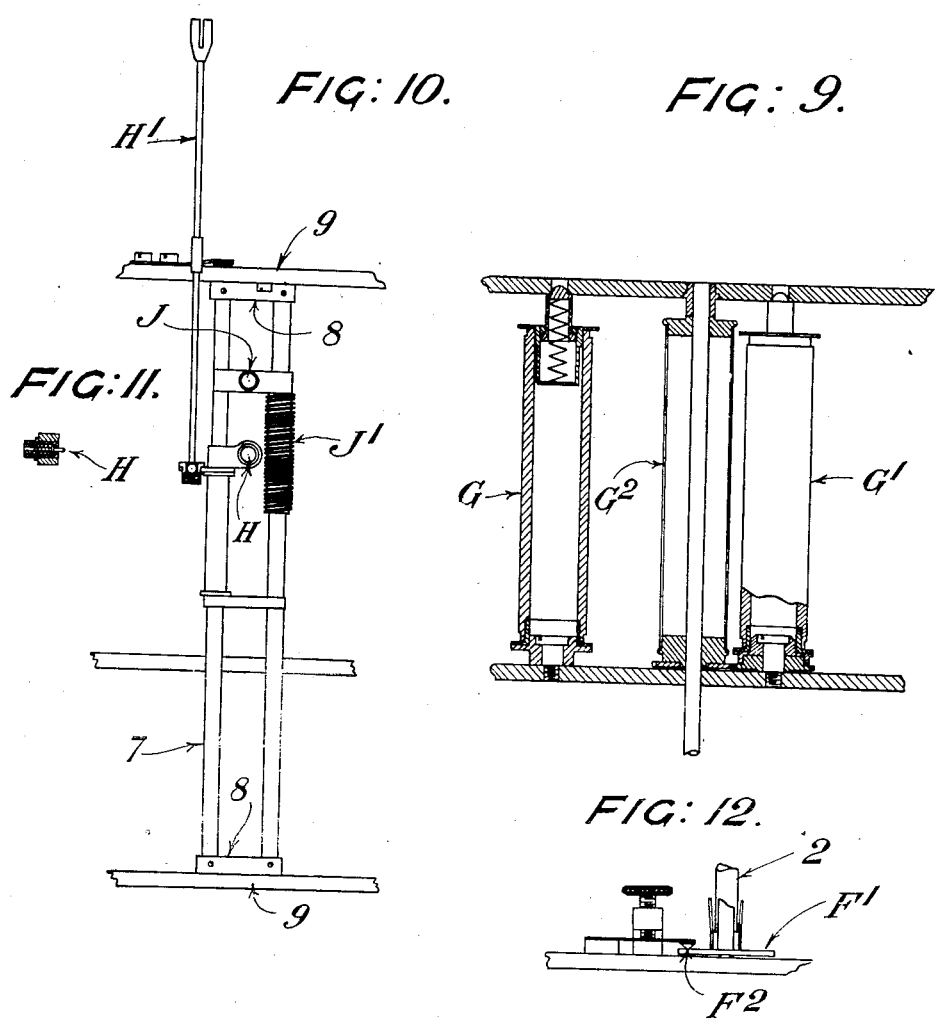

FIG: 13.
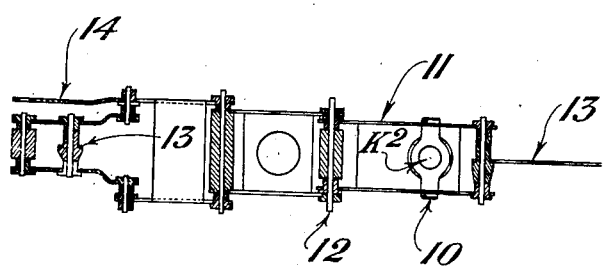
FIG: 14.
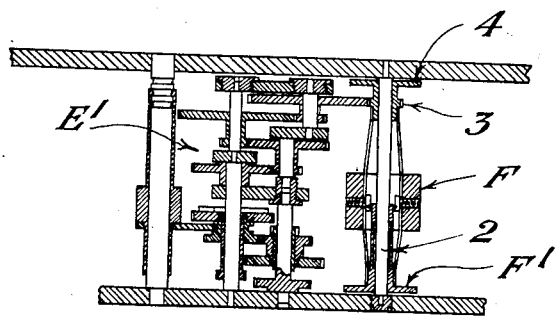
Inventors.
Archibald Barr
William Stroud
By T. Walter Fowler
Atty.

UNITED STATES PATENT OFFICE.

ARCHIBALD BARR AND WILLIAM STROUD, OF ANNIESLAND, GLASGOW, SCOTLAND, ASSIGNORS TO BARR AND STROUD, LIMITED, OF GLASGOW, SCOTLAND.

INSTRUMENT FOR USE IN TESTING TORPEDOES.

1,404,422.     Specification of Letters Patent.     Patented Jan. 24, 1922.

Application filed July 17, 1920. Serial No. 397,101.

*To all whom it may concern:*

Be it known that we, ARCHIBALD BARR and WILLIAM STROUD, subjects of the King of Great Britain and Ireland, and both of Caxton Street, Anniesland, Glasgow, Scotland, have invented new and useful Improvements in or connected with Instruments for Use in Testing Torpedoes, of which the following is a specification.

This invention relates to the production of instruments for use in testing torpedoes by means of which indications appertaining to depth or roll or both are recorded by producing markings upon a travelling sheet to which motion at a regular speed is imparted from a spring driving motor. For regulating the speed of drive a governor is provided and provision may be made for varying the rate at which the regulated speed shall be applied. The indications appertaining to depth or roll are made by a marker adapted to bear upon the travelling sheet, which, or each of which, is guided to move in a direction at right angles to the direction of motion of the travelling sheet. For recording indications appertaining to depth a marker is provided which derives its motion from a piston subjected to pressure due to submersion, the piston acting against a resistance, derived, for example, from a spring, and for recording indications appertaining to roll a marker is provided which derives its motion from a pendulum suspended about an axis parallel to the axis of the torpedo. For retaining the mechanism inactive until required, provision is made for locking the driving motor and for releasing it by the action of projecting the torpedo upon its course.

The mechanism provided in the construction of instruments according to this invention may be constructed so as to be contained within a tubular casing, arranged when in use with its axis at right angles, more or less, to the axis of the torpedo and normally vertical, of which successive sections are occupied by the respective mechanisms, for instance, the motor mechanism may occupy a section at the base of the tubular casing, the depth indicating mechanism a section at the head, the recording mechanism a section adjacent to the latter, and the controlling mechanism the section between the section occupied by the motor mechanism and that occupied by the recording mechanism.

An example of construction in which the component mechanisms are arranged capable of being contained within a tubular casing, will now be described with reference to the accompanying drawings, in which:—

Figure 1 is a sectional side elevation and Figure 2 is a sectional front elevation.

Figure 3 is an inverted sectional plan, and Figures 4, 5, 6, 7 and 8 are sectional plans taken respectively about the lines X, $X^1$, $X^2$, $X^3$, $X^4$ and $X^5$, see Figures 1 and 2.

Figure 9 is a sectional elevation, and Figure 10 is an elevation, Figure 11 is a sectional elevation of a detail and Figure 12 is an elevation illustrating parts of the mechanisms.

Figure 13 is a developed plan and Figure 14 is a developed elevation of portions of the mechanism to be described.

A suitable character of motor mechanism consists as illustrated of two helical springs A, B connected in series, the two springs being mounted upon a shaft 1 concentric to the axis of the instrument, each spring being contained within a cylindrical box, one box $A^1$, at the base, which is rotated to wind up the springs, the other box $B^1$, adjacent thereto, which rotates as the drive is produced. In this arrangement one end of each spring is connected to its box the other to the concentric shaft 1, pawl and ratchet gear, see Figure 3, being provided arranged to permit the box $A^1$ to rotate only in the direction required for winding up the springs, the gear consisting of pawls 21 arranged to engage with ratchet teeth formed about the periphery of the box $A^1$.

The spring boxes $A^1$, $B^1$ and the parts comprising the other mechanisms are mounted and carried upon a framing C the general outer limits of which come within a cylindrical space, the head $C^1$ of the frame constituting a cover, and for use in conjunction with the mechanism a cylindrical casing D is provided the bore of which is slightly greater than the diameter of the outer limits of the framing C, the casing D having a closed base $D^1$. Into the casing D the mechanism is adapted to be inserted and there retained in position by the cover $C^1$ being connected to the head of the casing D, say, as indicated, by screwed connection forming a tight joint.

A suitable character of regulating and speed varying mechanism, which may as explained be contained in the section above that occupied by the motor mechanism, comprises a shaft E, see Figures 1 and 4, in driving connection with the spring motor furnished with a governor F, see also Figure 14. The governor F, which is of known construction, comprises an axially movable braking disc $F^1$, see Figure 12, which in action is raised to bear against a friction pad $F^2$, which is adjustable for varying the speed at which the braking disc comes into contact with it. On the shaft 2 of the governor a pinion 3, see Figures 1 and 14, is fixed, arranged in gear with one of the wheels of a variable speed transmission gear $E^1$. Associated with the governor shaft 2 provision may also be made for imparting an initial supplementary drive to assist in causing the governor shaft 2 to acquire quickly its full speed. For this purpose a disc 4, see Figures 1 and 6, is fixed to the governor shaft 2 having three teeth, one for use in conjunction with an arm 5 mounted to swing about a fixed pivot at 6, the axis of which is parallel to the governor shaft 2, the arm 5 having a jaw at its end adapted to engage with the tooth when the arm 5 is withdrawn from a position into which it tends to move under the influence of a spring, provision, hereinafter referred to, being made for locking the parts when set in the position for starting.

A suitable character of mechanism as illustrated, see Figures 1, 2 and 9, for carrying and imparting the travel required to the sheet (a sheet of paper for example) consists of axial supports for holding in position a cylinder G upon which a roll of paper is wrapped with the inner end of the roll connected to the cylinder. Axial sockets are also provided for supporting a cylinder $G^1$ to which the outer end of the roll is adapted to be led and connected so that when rotated the paper will be wound from the charged onto the receiving cylinder. A guide drum $G^2$ is also provided over the surface of which the paper in passing from the charged to the receiving cylinder is led, and this drum $G^2$ affords support to the portion of the paper on which the markings are required to be made. The cylinders G, $G^1$ are adapted to be readily removed to permit others to be placed in position. The axes of these axial supports and the axis of the guide drum $G^2$ are arranged parallel to one another and parallel to the axis of the instrument. The drive from the transmission gear is imparted to the guide drum $G^2$ and communicated therefrom to the receiving cylinder $G^1$ by toothed gear through the intervention of a friction coupling, the drive communicated being such that the peripheral speed of the receiving cylinder $G^1$ would, if unrestrained, be greater than that of the guide drum $G^2$, so that the paper while passing from the charged cylinder G over the guide drum $G^2$ in being wound upon the receiving cylinder $G^1$ is held in tension.

The paper, which is not shown in the drawings, in passing over the guide drum $G^2$ thus presents a transversely supported strip parallel to the axis of the instrument and at a position outside this supported strip (a marker if depth or roll only is to be recorded,) two markers H and J, see Figures 7, 10 and 11, are mounted on a guide to slide parallel with the axis of the instrument in contact with the surface of the paper, provision being made for moving the markers each in accordance with the conditions to be recorded. A guide for this purpose may consist as shown of a rod 7 carried at the outer ends of two arms 8, 8 which are pivoted to turn about an axis 9 at their inner ends, so that the markers H, J may be brought to bear upon the paper or removed from contact therewith as required. The guide may be retained in the position required for producing markings by means of a detent.

The marker H appertaining to depth mounted to slide upon the guide 7 is connected by a connecting rod $H^1$ with lever and link elements, constituting a motion multiplying system, with a piston K, see Figures 1 and 2, exposed at its head to the pressure external to the casing D within which the mechanism is supported. In order to enable the piston K to be subjected to the external pressure and a tight jointing to be maintained to exclude water from the casing D, a flexible covering $K^1$ impervious to water is provided to extend over the top of the piston K and be clamped between the head $C^1$ and a cap $C^2$ to produce a water tight joint. Within the rim of the cap $C^2$ apertures are formed so as to give free access of pressure to the top of the flexible covering $K^1$ of the piston K. Extending axially downwards from the piston is a rod $K^2$, to which, see Figures 1, 2, 8 and 13, there is connected about trunnions 10 a rocking lever 11 pivoted at its inner end to rock about a horizontal axis 12 on one side, the outer end of the lever 11 extending beyond the piston rod $K^2$ on the other side. To the outer end of this lever a link 13 is connected, the second element of a motion multiplying system to the last element 14 of which the upper end of the connecting rod $H^1$ of the depth marker H is coupled, the couplings at the ends of the connecting rod $H^1$ being such as to permit limited motion of a universal character.

For resisting the inward movement of the piston K under the influence of pressure external to the casing D, a spring is provided which may be arranged to sustain the thrust at the axis of the piston rod. For instance, as illustrated, see Figures 1 and 2, the lower end of the piston rod $K^2$ may be formed with a circular recess and in axial alignment therewith a corresponding recess is formed in the surface of an abutment carried by the framing. Into these recesses the opposite ends of a spring L in compression are adapted to be sprung. By this arrangement springs exerting different degrees of resistance may be inserted in accordance with the range of depth to which the indications are to apply. Springs for this purpose may, as shown, consist of a strip of spring steel having a semi-circular, more or less, body portion, with two arms from the ends of its body extending parallel, more or less, to one another, and ends projecting axially outwards from each other, each end terminating in a point adapted to engage with its respective recess.

The marker J appertaining to roll, see Figures 1, 2, 7 and 10, mounted to slide upon the guide 7 may be provided with a rack $J^1$ circular in cross section, mounted about the axis 9 of the pivots of the guide and adapted to slide thereon for which purpose the pivots may consist of a circular rod. In mesh with the rack $J^1$ there is a toothed sector N mounted to rock about an axis 15 parallel with the axis of the torpedo, the sector being provided with a pendulum P.

For locking the motor mechanism while the springs are being wound up and for retaining it inactive until required for action, a longitudinally arranged rod R, see Figures 1 and 6, may be provided having its lower end adapted to project in front of one of the teeth on the disc 4, a spring 16, see Figure 1, being provided tending to force the rod upwards and withdraw the lower end clear to permit the disc 4 to rotate, the upward movement of the rod being restricted. The upper end of the rod R extends through the head $C^1$ and cap $C^2$ and is formed with a crown $R^1$ adapted to be held in its depressed position by a catch 17 pivoted about an axis 18 at right angles to the axis of the torpedo. For automatically removing the catch 17 from the crown $R^1$ to release the rod R, a weighted slipper S is provided mounted to slide freely in a guide parallel to the axis of the torpedo and normally held away from the catch by a spring 19, the arrangement being such that upon discharging the torpedo the casing D and parts therein which are fixed to move therewith are impelled forward while the slipper S which is not so fixed lags and by impact with the catch 17 turns it upon its pivot whereby the rod R is released. The disc 4 of the governor F is released by this action, the supplementary drive, with that of the motor mechanism, is applied and the motor quickly acquires full speed.

We claim:—

1. An instrument for automatically recording depth for use in testing torpedoes, comprising a spring driving motor, a travelling sheet to which in the process of operation motion at a regular speed is imparted from the driving motor, a governor for regulating the speed of drive, a marker, adapted to bear upon the travelling sheet, guided to move in a direction at right angles to the direction of motion of the travelling sheet, a piston, which in the process of operation is subjected to pressure due to submersion, a spring resistance against which the piston acts, transmission mechanism whereby motion of the piston is magnified and transmitted to the marker, and mechanism for locking the spring driving motor and for releasing it by the action of projecting the torpedo upon its course.

2. An instrument for automatically recording depth for use in testing torpedoes, comprising a driving motor, a travelling sheet to which in the process of operation motion at a regular speed is imparted from the driving motor, a governor for regulating the speed of drive, a marker, adapted to bear upon the travelling sheet, guided to move in a direction at right angles to the direction of motion of the travelling sheet, a piston, which in the process of operation is subjected to pressure due to submersion, a spring resistance against which the piston acts consisting of a strip of spring steel having a more or less semi-circular body portion, with two arms from the ends of its body extending parallel more or less to one another and ends projecting axially outwards from each other each end terminating in a point, transmission mechanism whereby motion of the piston is magnified and transmitted to the marker, and mechanism for locking the driving motor and for releasing it by the action of projecting the torpedo upon its course.

3. An instrument for automatically recording depth for use in testing torpedoes, comprising a driving motor, a travelling sheet to which in the process of operation motion at a regular speed is imparted from the driving motor, a governor for regulating the speed of drive, a marker, adapted to bear upon the travelling sheet, guided to move in a direction at right angles to the direction of motion of the travelling sheet, a piston, which in the process of operation is subjected to pressure due to submersion, a spring resistance against which the piston acts, transmission mechanism whereby motion of the piston is magnified and transmitted to the marker, mechanism for locking the driving motor and for releasing it by the action of projecting the torpedo upon its course, and means for imparting an initial supplementary drive to assist in causing the governor shaft to acquire quickly its full speed.

4. An instrument for automatically recording depth for use in testing torpedoes, comprising a driving motor, a travelling sheet to which in the process of operation motion at a regular speed is imparted from the driving motor, gear for varying the rate at which the paper shall move, a governor for regulating the speed of drive, a marker, adapted to bear upon the travelling sheet, guided to move in a direction at right angles to the direction of motion of the travelling sheet, a piston, which in the process of operation is subjected to pressure due to submersion, a spring resistance against which the piston acts, transmission mechanism whereby motion of the piston is magnified and transmitted to the marker, and mechanism for locking the driving motor and for releasing it by the action of projecting the torpedo upon its course.

5. An instrument for automatically recording depth for use in testing torpedoes, comprising a driving motor, a travelling sheet to which in the process of operation motion at a regular speed is imparted from the driving motor, a governor for regulating the speed of drive, a marker, adapted to bear upon the travelling sheet, guided to move in a direction at right angles to the direction of motion of the travelling sheet, a piston, which in the process of operation is subjected to pressure due to submersion, a spring resistance against which the piston acts, transmission mechanism whereby motion of the piston is magnified and transmitted to the marker, and mechanism for locking the driving motor and for releasing it by the action of projecting the torpedo upon its course, a tubular casing, the mechanisms provided being constructed so as to be contained within the tubular casing of which successive sections are occupied by the respective mechanisms.

6. An instrument for automatically recording depth and roll for use in testing torpedoes, comprising a driving motor, a travelling sheet to which in the process of operation motion at a regular speed is imparted from the driving motor, a governor for regulating the speed of drive, two markers, each adapted to bear upon the travelling sheet, guided to move in a direction at right angles to the direction of motion of the travelling sheet, a piston, which in the process of operation is subjected to pressure due to submersion, a spring resistance against which the piston acts, transmission mechanism whereby motion of the piston is magnified and transmitted to one of the markers, a pendulum suspended about an axis parallel to the axis of the torpedo and transmission gear whereby motion is transmitted from the pendulum to the other marker, and mechanism for locking the driving motor and for releasing it by the action of projecting the torpedo upon its course.

7. An instrument comprising mechanisms constructed so as to be contained within a tubular casing of which successive sections are occupied by the respective mechanisms, motor mechanism occupying a section at the base, indicating mechanism a section at the head, recording mechanism a section adjacent to the head, and controlling mechanism a section between the section occupied by the motor mechanism and that occupied by the recording mechanism, substantially as and for the purposes set forth.

ARCHIBALD BARR.
WILLIAM STROUD.